2,729,622
Patented Jan. 3, 1956

United States Patent Office

2,729,622

POLYCARBOXYL- AND POLYCARBALKOXYL-CONTAINING POLYMERIZABLE QUATERNARY AMMONIUM MONOMERS AND THEIR POLYMERS

Charles J. Albisetti and Arthur L. Barney, Wilmington, Theodore L. Cairns, Newark, and Hilmer E. Winberg, Wilmington, Del., assignors to E. I. du Pont de Nemours & Company, Wilmington, Del., a corporation of Delaware No Drawing. Application April 11, 1952,
Serial No. 281,896

14 Claims. (Cl. 260—78.3)

This invention relates to new vinylidene compounds containing a quaternary ammonium group.

The use of nitrogen-containing monomers in polymerization and copolymerization has resulted in the preparation of polymers whose physical and chemical properties are susceptible to further modification. Such further modification is of considerable importance as a method of increasing dyeability of certain relatively inert polymers of ethylenically unsaturated compounds. Monomers polymerizable either alone or with other ethylenically unsaturated compounds to give polymers having good stability under acidic and alkaline conditions and also good dyeability are desirable. Thus, a polymer having the inertness of polyacrylonitrile but dyeable under conditions of substantial neutrality (with respect to acidity) would be of considerable economic importance in the textile industry. Various not entirely satisfactory attempts to solve this problem have been made, e. g., by the provision of copolymers of acrylonitrile with small percentages of a quaternary ammonium vinylidene compound. A defect of such copolymers previously evaluated is a lack of thermal stability after exposure to soaping or other alkaline boil-offs. This defect is of particular importance where the copolymer is intended for textile and similar uses since the alkaline environment of washing conditions the polymer for thermal instability and subsequent ironing deteriorates the polymer. Solution of this latter problem is represented by the processes and products of the application filed herewith by H. E. Winberg, Serial No. 281,901, but the solution is but partial. The thermal stability of the copolymers is thereby improved but still leaves something to be desired, particularly in thermal stability before alkaline boil-offs.

This invention has as an object the preparation of new monomeric organic compounds. A further object is the preparation of new intermediates, particularly for polymers. A still further object is the preparation of new monomers which can be polymerized and, with other addition polymerizable monomers, copolymerized. Another object is the preparation of polymers and copolymers, particularly acrylonitrile copolymers. Still another object is the preparation of dyeable acrylonitrile films and fibers of outstanding stability to washing and to ironing or other heat treatment. Other objects will appear hereinafter.

These objects are accomplished by the invention of monomers and polymers, including copolymers, therefrom, of quaternary ammonium salts whose anion is that of an acid of molecular weight up to, i. e., no more than, 250, and which contain in the cation but one non-aromatic carbon-carbon double bond and that in a vinylidene, $CH_2=C<$, group and a plurality of groups of the class consisting of carboxyl, COOH, salts and esters thereof and, when two are taken together, the carboxylic anhydride, —CO—O—CO—, group, said plurality of groups being not directly attached to the vinylidene group.

The monomers of this invention can be prepared by the reaction of a tertiary amine which contains a single vinylidene group and also a carboxyl group with an alkyl ester of a monochloro- or monobromoalkanoic acid. They can also be prepared by the reaction of an alkyl halide, sulfate, or arylsulfonate with a tertiary amine containing a vinylidene group and an anhydride group or a plurality of carbalkoxy groups. They can also be prepared by the reaction of a tertiary amine containing a vinylidene group with a neutral ester of a polycarboxylic acid having halogen, preferably chlorine or bromine, on an only singly bonded aliphatic carbon atom.

The present invention is generic to quaternary ammonium salts of acids of molecular weight up to 250 which salts contain in the cation but one carbon-carbon unsaturation and that in a single vinylidene, $CH_2=C<$, group and having a plurality of groups of the class consisting of carboxyl, COOH, salts and esters thereof and, when two are taken together, the carboxylic anhydride, —CO—O—CO—, group, said plurality of groups being not directly attached to the vinylidene group.

In a preferred embodiment the carboxyl (or salt or ester or anhydride thereof) groups are attached to the quaternary nitrogen by a wholly carbon chain of at least one carbon, preferably a saturated hydrocarbon chain, and the vinylidene group is attached to the quaternary nitrogen by a carbon containing chain of two or more chain atoms. The remaining groups in the cation attached to the quaternary nitrogen are generally hydrocarbon and preferably lower alkyl, i. e., alkyl radicals of 1 to 4 carbons.

The invention is thus generic to monounsaturated polymerizable quaternary ammonium salts having a plurality of carboxyl groups whether in the form of the carboxyl, —COOH, group itself or as an ester, salt, or carboxylic acid anhydride, —CO—O—CO— group. The anhydride —CO—O—CO— group of itself represents a plurality of carboxylic groups. In the case of ester groups COOR the alcohol, R, portion of the group is preferably alkyl of one to four carbons.

The following examples in which parts are by weight are illustrative of the invention.

EXAMPLE I

A. *Preparation of beta-vinyloxyethyldicarbomethoxy-ethylmethylammonium methylsulfate*

A mixture of 66 parts of beta-vinyloxyethylamine in 119 parts of absolute methanol was rapidly added with stirring to 150 parts of methyl acrylate. The resulting mixture was refluxed for three hours, then allowed to stand at room temperature for three days. Distillation gave 161 parts of dimethyl beta-vinyloxyethyliminodipropionate, B. P. 144–146° C./3.25 mm. mercury pressure, $n_D^{25}$ 1.4576.

*Analysis*

Calculated for $C_{12}H_{21}NO_5$: C, 55.6%; H, 8.17%; N, 4.40%; N. E. (neutral equivalent), 259.3
Found: C, 56.09%; H, 8.41%; N, 5.31%; N. E. 259.6

To a cold solution of 25.93 parts of dimethyl beta-vinyloxyethyliminodipropionate in 40 parts of methyl ethyl ketone was added 12.61 parts of methyl sulfate. The resulting solution after standing for two days at 4° C. had deposited hard white crystals. These were filtered in a dry nitrogen atmosphere and dried under vacuum to give 27 parts of product, M. P. 64–64.5° C. After crystallization from methyl ethyl ketone, the melting point was 64.5°–65.5° C.

*Analysis*

Calculated for $C_{14}H_{27}NO_9S$: C, 43.62%; H, 7.06%; N, 3.63%; S. 8.33%

Found: C, 43.68%; H, 7.42%; N, 3.86%, 3.69%; S, 8.38%, 8.42%

Infrared analysis of the quaternary ammonium monomer showed absorption bands at 5.8 microns corresponding to the carbonyl group, 6.15 microns corresponding to the vinyl linkage and 8.3 microns for the ether linkage.

B. Preparation of an acrylonitrile/beta-vinyloxyethyldicarbomethoxyethylmethylammonium methylsulfate copolymer To a solution of 0.432 part of potassium dihydrogen phosphate in 190 parts of distilled water was added sufficient 0.5 N sodium hydroxide to give a pH of 7. In the resulting solution was dissolved 13 parts of distilled acrylonitrile, 0.685 part of the above beta-vinyloxyethyldicarbomethoxy - ethylmethylammonium methylsulfate, 0.189 part of thiourea and 5.68 parts of 3% hydrogen peroxide solution. The whole was agitated under nitrogen at room temperature for three hours. After filtration and washing with water followed by methanol, there was obtained 8.5 parts of white polymer of inherent viscosity 1.57 (0.2% solution in dimethylformamide at 25% C.). A film cast on glass at 100° C. from a 15% solution of the copolymer in dimethylformamide was colorless and transparent. It dyed to deep shades with typical acid dyes at a pH of 6 and had good thermal stability even after hot alkaline soap treatments.

EXAMPLE II

A. Preparation of beta-vinyloxyethyldicarbomethoxyethylmethylammonium p-toluenesulfonate A mixture consisting of 25.93 parts of dimethyl beta-vinyloxyethyliminodipropionate and 18.62 parts of methyl p-toluenesulfonate was permitted to stand at room temperature for five days. The resulting thick, light yellow oil solidified on trituration with ether affording crystals melting at 71–72° C. The compound was soluble in acetone, methyl alcohol, absolute ethanol, ethyl acetate, dioxane, n-propyl alcohol, n-butyl alcohol and water. It was insoluble in benzene and isopropyl ether.

Analysis

Calculated for $C_{20}H_{31}NO_8S$: S, 7.20%; N, 3.15%
Found: S, 7.42%, 7.40%; N, 3.24%, 2.96%

B. Preparation of an acrylonitrile/beta-vinyloxyethyldicarbomethoxyethylmethylammonium p - toluenesulfonate copolymer A copolymer of acrylonitrile with beta-vinyloxyethyldicarbomethoxyethylmethylammonium p - toluenesulfonate was prepared as given in Example I by substituting this quaternary for beta-vinyloxyethyldicarbomethoxyethylmethylammonium methylsulfate. There was obtained nine parts of polymer of inherent viscosity 1.68 (0.2% solution in dimethylformamide at 25° C.). Films of this acrylonitrile copolymer dyed readily in a manner analogous to those of the copolymer of Example I. This polymer also had good thermal stability even after hot alkaline soap treatments.

EXAMPLE III

A. Preparation of the sodium salt of beta-vinyloxyethyldicarboxyethylmethylammonium methylsulfate The quaternary ammonium methylsulfate of Example I was hydrolyzed to an aqueous solution of the corresponding carboxy-containing quaternary by diluting an aqueous solution corresponding in volume to 36.95 parts of 4.06 N sodium hydroxide and 19.27 parts of the methylsulfate diluted to 500 parts by weight. After thorough mixing, the clear solution had a pH of 11.75, while after standing for two hours the pH was 10.63. In two days the pH had dropped to 10.22 at which point it remained essentially unchanged.

B. Preparation of an acrylonitrile/sodium carboxy salt copolymer

To 17.8 parts of the hydrolyzed solution of part A diluted with 170 parts of distilled water was added 0.342 part of potassium dihydrogen phosphate, 13 parts of distilled acrylonitrile, 0.189 part of thiourea and 5.68 parts of 3% hydrogen peroxide solution. The polymerization was allowed to proceed in a nitrogen atmosphere for three hours at room temperature. At the end of this time the polymer was washed with water, then with acidified methol, and dried. There was obtained nine parts of white polymer of intrinsic viscosity 1.73 (0.2% solution in dimethylformamide at 25° C.). Films cast from a 15% solution of the polymer in dimethylformamide were colorless and tough. They dyed readily at pH 6 with acid dyes.

EXAMPLE IV

A. Preparation of beta-vinyloxyethyldicarboethoxymethylmethylammonium methylsulfate In a round-bottomed flask fitted with a stirrer, reflux condenser, and thermometer was placed 21.8 parts of beta-vinyloxyethylamine, 53 parts of anhydrous sodium carbonate, and 157 parts of absolute ethanol. Through a dropping funnel was gradually added 83.5 parts of ethyl bromoacetate over a period of one hour. During this time the mixture was heated to gentle reflux and was vigorously stirred. When the addition of the bromoester had been completed, stirring and refluxing was continued for one-half hour; the mixture was then cooled and filtered, followed by concentration under vacuum and a final filtration. The residue was subjected to distillation giving 34.5 parts of product boiling at 128–132° C./1.5–2.0 mm. mercury pressure. On redistillation the diethyl beta-vinyloxyethyliminodiacetate boiled at 106° C./0.5 mm. mercury pressure, $n_D^{25}$ 1.4498.

Analysis

Calculated for $C_{12}H_{21}NO_5$: N, 5.40%; N. E., 259.3
Found: N, 5.35%, 5.64%; N. E., 260.7, 258.9

A mixture of 2.59 parts of diethyl beta-vinyloxyethyliminodiacetate and 1.26 parts of methyl sulfate in 3.6 parts of ethyl ether was allowed to stand at room temperature overnight. The solid that separated was removed by filtration, washed with ether, and dried in vacuo. There was obtained 1.5 parts of white hygroscopic beta-vinyloxyethyldicarboethoxymethylmethylammonium methylsulfate, M. P. 79–80° C. Crystallization from methyl ethyl ketone gave crystals of melting point of 83–85° C.

Analysis

Calculated for $C_{14}H_{27}NO_9S$: N, 3.63%; S, 8.32%
Found: N, 3.39%, 3.44%; S, 8.03%

B. Preparation of an acrylonitrile/beta-vinyloxyethyldicarboethoxymethylmethylammonium methylsulfate copolymer A copolymer of acrylonitrile with beta-vinyloxyethyldicarboethoxymethylmethylammonium methylsulfate was prepared as given in Example I-B, substituting the quaternary of Example IV–A for beta-vinyloxyethyldicarbomethoxyethylmethylammonium methylsulfate. There was obtained 8.5 parts of polymer of inherent viscosity 1.78 (0.2% solution in dimethylformamide at 25° C.). Films cast from dimethylformamide solution were dyed to deep shades with typical acid dyes independent of the pH of the dye bath within the pH range of 2–8. The polymer had good thermal stability even after hot alkaline soap treatments.

EXAMPLE V

A. Preparation of carbomethoxymethyl-beta-carbomethoxyethyl - beta - methacrylyloxyethylmethylammonium bromide To a solution of 112.7 parts of N-methylethanolamine in 120 parts of methanol was added portionwise 155 parts of methyl acrylate stabilized with phenothiazine. The mixture was cooled to maintain the temperature below 40° C. The solution was permitted to stand for two days, after which time direct distillation gave 208 parts of colorless product boiling largely at 97° C. under 2.5 mm. of mercury pressure. On redistillation the beta-hydroxyethyl-beta-carbomethoxyethylmethylamine boiled at 83–85° C. under 1 mm. of mercury pressure, $n_D^{25}$ 1.4505.

*Analysis*

Calculated for $C_7H_{15}NO_3$: C, 52.15%; H, 9.38%; N, 8.69%
Found: C, 52.49%; H, 9.59%; N, 8.79%, 8.84%

To a solution of 50 parts of the above tertiary amine, 34.3 parts of triethylamine and 50 parts of dry dioxane cooled to 10–15° C. was slowly added 32.6 parts of freshly distilled methacrylyl chloride, maintaining the temperature at 10–20° C. After the addition was complete, the mixture was warmed to room temperature, stirred for an adidtional two hours, then poured into 300 parts of water. The aqueous layer was saturated with sodium chloride and made slightly alkaline with dilute ammonium hydroxide. The mixture was then extracted four times with ether and the combined extracts dried over anhydrous magnesium sulfate. After filtration the solution was distilled to give 61.3 parts of crude product boiling at 92–113° C. under 1.2–1.6 mm. of mercury pressure. On redistillation, 50.6 parts of methyl-beta-carbomethoxyethyl-beta-methacrylyloxyethylamine, boiling at 75° C. under 0.02 mm. mercury pressure, $n_D^{25}$ 1.4544, was obtained. This ester polymerized to a water-white polymer when heated in the presence of azodiisobutyronitrile for one hour at approximately 70–80° C.

*Analysis*

Calculated for $C_{11}H_{19}O_4N$: C, 57.62%, H, 8.36%; N, 6.16%
Found: C, 57.97%; H, 8.46%; N, 6.18%

Treatment of methyl-beta-carbomethoxyethyl - beta-methacrylyloxyethylamine with a molecular equivalent of methyl bromoacetate in the presence of anhydrous ether gave the quaternary bromide as an oil insoluble in ether but soluble in water or acetone.

B. *Preparation of an acrylonitrile/carbomethoxymethyl-beta - carbomethoxyethyl - beta - methacrylyloxethyl-methylammonium bromide*

A copolymer of acrylonitrile with the quaternary monomer of Example V–A was prepared as given in Example I–B, substituting the quaternary of Example V–A for the quaternary of Example I–A. There was obtained 9.2 parts of polymer of inherent viscosity 1.57 (0.2% solution in dimethylformamide at 25° C.). Films of the copolymer obtained by casting 15% dimethylformamide solutions on glass were readily dyed with a typical acid dye at a pH of 6.

EXAMPLE VI

A. *Preparation of gamma-vinyloxypropyldicarbometh-oxyethylmethylammonium p-toluenesulfonate*

A mixture of 253 parts of gamma-aminopropanol and 25 parts of solid potassium hydroxide was heated for 10 hours at 110° C. under 200 lbs./sq. in. acetylene pressure. After two distillations the reaction mixture gave 254 parts of colorless gamma-aminopropyl vinyl ether, B. P. 141–142° C., $n_D^{25}$ 1.4222.

*Analysis*

Calculated for $C_5H_{11}NO$: C, 59.37%; H, 10.96%; N, 13.85%
Found: C, 59.49%; H, 11.02%; N, 11.97%, 12.14%

A mixture of 24.1 parts of gamma-aminopropyl vinyl ether, 65 parts of methyl acrylate stabilized with phenothiazine and 40 parts of methanol was refluxed for six hours. The product, dimethyl gamma-vinyloxypropyl-iminodipropionate, was then isolated by distillation to give 51 parts boiling at 120–124° C. under 0.40–0.45 mm. mercury pressure, $n_D^{25}$ 1.4572.

*Analysis*

Calculated for $C_{13}H_{23}NO_3$: N, 5.13%; N. E., 273.3.
Found: N, 5.53%, 5.47%; N. E., 272.0, 272.7.

A mixture of 2.73 parts of the above ester and 1.86 parts of methyl p-toluenesulfonate was kept under nitrogen at room temperature for three days. The viscous, clear product was triturated with ether to effect crystallization. The product was crystallized from methyl ethyl ketone to give a white hygroscopic solid melting at 73.5–75.5° C.

*Analysis*

Calculated for $C_{21}H_{33}NO_8S$: C, 54.88%; H, 7.24%; N, 3.05%; S, 6.98%
Found: C, 54.82%; H, 7.25%; N, 2.87%, 2.87%; S, 6.97%, 7.03%.

B. *Preparation of an acrylonitrile/gamma-vinyloxypropyl-dicarbomethoxyethylmethylammonium p - toluene-sulfonate copolymer*

A copolymer of acrylonitrile with the quaternary monomer of Example VI was prepared as given in Example I–B, substituting the quaternary of Example VI–A for the quaternary monomer of Example I–A. There was obtained 10 parts of copolymer of inherent viscosity 1.56 (0.2% solution in dimethylformamide at 25° C.). Films of this copolymer readily accepted acid dyes at pH 6 and had good thermal stability both before and after alkaline soap treatments.

EXAMPLE VII

A. *Preparation of gamma-vinyloxypropyldicarbomethoxy-methylmethylammonium methylsulfate*

In a flask with a dropping funnel, sealed stirrer and reflux condenser was charged 50.5 parts of gamma-vinyl-oxypropylamine, 106 parts of anhydrous sodium carbonate, and 250 parts absolute ethanol. The mixture was heated to reflux with stirring and over a two-hour period 153 parts of methyl bromoacetate was added dropwise. When the addition was complete, stirring and refluxing were continued for an hour, after which time carbon dioxide evolution had practically ceased. The reaction mixture was then filtered and the solvent removed. Eighty-two parts of the product, dimethyl gamma-vinyl-oxypropyliminodiacetate, was isolated by distillation, B. P. 100–105° C./0.2 mm. mercury pressure, $n_D^{25}$ 1.4552.

*Analysis*

Calculated for $C_{11}H_{19}NO_5$: C, 53.86%; N, 7.81%; N. E., 245.3.
Found: C, 54.46%; H, 7.84%; N. E., 251.2, 249.8, 248.8.

A solution of 2.59 parts of the above ester and 1.26 parts of methyl sulfate in 4 parts of methyl ethyl ketone was permitted to stand at room temperature for seven days. Evaporation of the solvent gave the quaternary compound as a colorless, water-soluble, viscous oil.

B. *Preparation of an acrylonitrile/gamma-vinyloxy-propyldicarbomethoxymethylmethylammonium methyl-sulfate copolymer*

A copolymer of acrylonitrile with the quaternary monomer of Example VII–A was prepared as given in Example I–B, substituting the quaternary of Example VII–A for the quaternary of Example I–A. The resulting copolymer, which weighed 8.8 parts, had an inherent viscosity of 1.67 (0.2% solution in dimethylformamide at 25° C.). Colorless film obtained by casting 15% solutions of the copolymer in dimethylformamide on glass were dyed by typical acid dyes at a pH of 6.

EXAMPLE VIII

*Beta-vinyloxyethyldicarbomethoxymethylmethylammonium methylsulfate*

Dimethyl beta-vinyloxyethyliminodiacetate was prepared in a manner analogous to that given in Example VII for dimethyl gamma-vinyloxypropyliminodiacetate by the reaction of 43.6 parts of beta-vinyloxyethylamine with 153 parts of methyl bromoacetate in 250 parts of absolute ethanol employing 106 parts of anhydrous sodium carbonate as the acid acceptor. There was obtained 85 parts of crude product boiling at 97–104° C./0.3–0.5 mm. mercury pressure. On redistillation the ester boiled largely at 103° C./0.45 mm. mercury pressure, $n_D^{25}$ 1.4555.

*Analysis*

Calculated for $C_{10}H_{17}O_5N$: N, 6.06%; N. E., 231.3.
Found: N, 6.10%, 6.26%; N. E., 236.6, 236.2.

EXAMPLE IX

*Alpha,beta-dicarboethoxyethyl-beta-vinyloxyethyldimethylammonium methylsulfate*

Treatment of N-methylethanolamine containing 10% by weight of potassium hydroxide with excess acetylene at 200 lbs./sq. in. and 110° C. gave methyl-beta-vinyloxyethylamine, B. P. 121–122° C., $n_D^{25}$ 1.4279; N. E., 101.9.

A mixture of 10.1 parts of this amine, 17.2 parts of ethyl fumarate and 10 parts of absolute ethanol was refluxed for seven hours. Distillation of the reaction mixture gave in addition to the ethanol and unreacted reagents 15 parts of diethyl N-methyl-N-beta-vinyloxyethylaminosuccinate, B. P. 116–117° C./2.0 mm. mercury pressure.

*Analysis*

Calculated for $C_{13}H_{23}NO_5$: N, 5.13%.
Found: N, 5.12%, 5.25%.

Treatment of the substituted succinate in bulk or in diethyl ether with a molecular equivalent of methyl sulfate gave the quaternary compound as a water-soluble oil which slowly solidified on standing.

EXAMPLE X

A. *Preparation of gamma-methacrylyloxypropyldicarbomethoxymethylmethylammonium methylsulfate*

To a cold solution of 189 parts of chloroacetic acid in 150 parts of water was added slowly a cold solution of 160 parts of sodium hydroxide in 500 parts of water. To the resulting solution was added slowly 75 parts of propanolamine in 150 parts of water. During the latter addition, and for two hours thereafter, the solution was stirred and the temperature maintained below 50° C. At the end of this time, a solution of 257 parts of barium chloride dihydrate in 500 parts of hot water was added to the reaction mixture which was then heated on a steam bath for one-half hour. The precipitated barium salt was removed by filtration and washed with hot water. After vacuum drying, the salt, which weighed 222 parts, was suspended in 600 parts of water and the suspension was heated to boiling while being stirred. The calculated quantity of sulfuric acid was then introduced gradually from a separating funnel into the well-stirred mixture over a period of about one hour. The precipitated barium sulfate was then removed by filtration and the filtrate evaporated to dryness under vacuum. The white residue of gamma-hydroxypropyliminodiacetic acid was washed with acetone and dried to give 112 parts of product, M. P. 197–199° C. (dec.).

*Analysis*

Calculated for $C_7H_{13}NO_5$: C, 43.97%; H, 6.85%; N, 7.33%.
Found: C, 43.76%; H, 6.98%; N, 7.33%, 7.39%.

A suspension of 50 parts of the above acid in 790 parts of dry methanol was saturated with dry hydrogen chloride while being cooled in an ice bath. After standing for 20 hours, the volatile materials were removed from the clear solution under vacuum. The viscous residue was covered with anhydrous ether and dry ammonia was bubbled into the mixture while it was being stirred. After saturation, the mixture was filtered and the filtrate distilled to give 40.4 parts of dimethyl gamma-hydroxypropyliminodiacetate as a colorless, viscous liquid boiling at 138° C. under 1.5 mm. mercury pressure, $n_D^{25}$ 1.4579.

*Analysis*

Calculated for $C_9H_{17}NO_5$: C, 49.30%; H, 7.82%; N, 6.39%.
Found: C, 49.09%; H, 7.93%; N, 6.24%, 6.30%.

According to the procedure of Example V, 18.3 parts of methacrylyl chloride was added to a solution of 37.5 parts of the above tertiary amine and 18.2 parts of triethylamine in 50 parts of dry dioxane. Upon distillation of the resultant reaction product, 18.5 parts of dimethyl gamma-methacrylyloxypropyliminodiacetate, having a boiling point of 140° C. under 0.4 mm. mercury pressure and $n_D^{25}$ 1.4614, was obtained.

*Analysis*

Calculated for $C_{13}H_{21}O_6N$: C, 54.40%; H, 7.32%; N, 4.88%
Found: C, 54,70%; H, 7.56%; N, 5.01%

Two and eighty-seven hundredths parts of dimethyl gamma-methacrylyloxypropyliminodiacetate and 1.26 parts of dimethyl sulfate were mixed in 3.2 parts of methyl ethyl ketone. After standing overnight, approximately 0.3 part of anhydrous ether was added and the solution cooled in an ice bath. The quaternary separated as a white crystalline solid. After two crystallizations from methyl ethyl ketone the gamma-methacrylyloxypropyldicarbomethoxymethylmethylammonium methylsulfate melted at 83.5–84.5° C.

*Analysis*

Calculated for $C_{15}H_{27}O_{10}NS$: C, 43,65%; H, 6.58%; N, 3.39%
Found: C, 43.70%; H, 0.61%; N, 3.31%, 3.36%

B. *Preparation of an acrylonitrile/gamma-methacrylyloxypropyldicarbomethoxymethylmethylammonium methylsulfate copolymer*

To 190 parts of an aqueous solution which was 0.1 M boric acid and 0.1 M potassium chloride was dissolved 13 parts of distilled acrylonitrile, 0.685 part of the quaternary of Example X-A, 0.189 part of thiourea and 5.68 parts of 3% hydrogen peroxide solution. Polymerization was permitted to proceed at room temperature under nitrogen over a period of three hours. At the end of this time the polymer was isolated by filtration, washed with water, followed by methanol, acidified with hydrochloric acid and dried. The white polymer weighed 9.8 parts and had an inherent viscosity of 1.46 (0.2% solution in dimethylformamide at 25° C.). Films prepared by casting 15% solutions of the polymer in dimethylformamide were clear and colorless. They readily accepted typical acid dyes from neutral dye baths.

EXAMPLE XI

A. *Anhydro-2,3-dicarboxybenzyl-beta-methacrylyloxyethyldimethylammonium bromide*

A mixture of 8.1 parts of 3-methylphthalic anhydride, 9 parts of N-bromosuccinimide, 0.5 part of benzoyl peroxide and 80 parts of carbon tetrachloride was refluxed for four hours. The mixture was then cooled and filtered to remove the succinimide. The filtrate was evaporated to dryness under vacuum at room temperature and the light yellow solid residue was recrystallized from ether. Six parts of 3-bromomethylphthalic anhydride having a melting point 70–75° C. was obtained. After one recrystallization, this product had the melting point 82–87° C.

One and six-tenths parts of 3-bromomethylphthalic anhydride was dissolved in a mixture of 1.57 parts of acetonitrile and 1.6 parts of methyl ethyl ketone. To this solution was added 1.06 parts of beta-dimethylaminoethyl methacrylate and the mixture was cooled in an ice bath. After standing six hours, 7 parts of anhydrous ether was added. The quaternary salt separated as a thick, white oil which crystallized on standing, was recrystallized from a 1:2 acetonitrile-anhydrous ether mixture. The white crystalline quaternary was very water-soluble, hygroscopic and had a melting point of 115–118° C. An aqueous solution of this produce when heated at 85° C. in the presence of azodiisobutyramidine hydrochloride for 15 minutes yielded a white polymer having a melting point of 195–200° C.

B. *Preparation of an acrylonitrile/beta-dimethylaminoethyl methacrylate/3-bromomethylphthalic anhydride quaternary copolymer*

A 95/5 copolymer of acrylonitrile with the quaternary salt of beta-dimethylaminoethyl methacrylate and 3-bromomethylphthalic anhyride of Example XI–A was prepared using the procedure of Example I–B. Eleven and three-tenths parts (82.5% conversion) of dry, white polymer was obtained. A film prepared by solvent casting a 15% solution of the polymer in dimethylformamide exhibited very good dye-receptivity when boiled for one-half hour in an 0.02% solution of pH 6.0 of a blue anthraquinone dye whose recognized foreign prototype is Alzarin Supra Blue A.

The present invention is generic to quaternary ammonium salts of acids of molecular weight up to 250 which salts contain in the cation, bonded to one valence of the nitrogen, a substituent containing a single vinylidene group and, the remaining substituents on the cation nitrogen containing a plurality of carboxyl, —COOH, groups or such groups esterified or cation neutralized or, as a combination of two such carboxyl groups, anhydride —CO—O—CO— groups. The vinylidene group is the sole non-aromatic carbon-carbon unsaturation in the salt and is linked to the cation nitrogen by a carbon-containing chain. The carboxyl, esterified carboxyl, neutralized carboxyl or anhydride groups are each linked to the nitrogen by a carbon-containing chain of at least one atom.

A particularly desirable, because of availability of intermediates and readiness of preparation, class of monomers of this invention has the formula

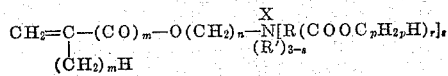

wherein X is the anion of an acid of molecular weight up to 250, $m$ is a cardinal number up to one, $n$ is a plural integer up to three, $p$ is a cardinal number up to four, $r$ and $s$ are integers each up to three, and at least one a plural integer, R' is an alkyl radical of up to four carbons and R is a saturated aliphatic hydrocarbon radical of valence $r+1$.

This class of compounds includes the vinyloxyalkyl, $CH_2=CH—O—$ alkyl quaternary ammonium compounds and the acrylyloxyalkyl, including methacrylyloxyalkyl, quaternary ammonium compounds. The molecular weight of the radical attached to each carboxy group is generally less than 57, i. e., equivalent to the weight of the butyl radical or less.

The anions of the salts of this invention are those of acids of molecular weight up to 250 since high molecular weight anions tend to decrease the polymerizability of the monomers. The anion is generally halogenide, e. g., chloride; sulfate or sulfonate, e. g., methosulfate or toluenesulfonate, or one which, a portion of one substituent on the nitrogen, forms with the nitrogen a betaine (inner salt).

By the methods given above there can be prepared the new quaternary ammonium vinylidene monomers of this invention including not only those exemplified in the above examples but also many others including N-alpha, beta - dicarbomethoxyethyl - N-beta-methacrylyloxyethyl-N,N-dimethylammonium chloride, N-alpha,beta-dicarbethoxy - beta-propenyl-N,N,N-trimethylammonium chloride, N-alpha-beta-dicarbmethoxy-beta-methylpropyl-N-beta-methacrylyloxyethyl-N,N-dimethylammonium chloride, and N-alpha-carbomethoxy-o-carbomethoxybenzyl-N - beta - methacrylyloxyethyl - N,N-dimethylammonium bromide.

The compounds of this invention have utility in various fields. For example, they can be employed in films and photographic papers, or as chemical intermediates, e. g., they are capable of reaction at the active carbon to carbon double bond with halogen or mercaptans. The compounds of this invention are of use as surface active agents and polymers therefrom are also of use in the surfactant field. Furthermore, the compounds of this invention can be employed in monomeric or polymeric form in the formulation of bactericidal compositions, or as antistatic agents for textiles.

A particularly important use of the monomers of this invention lies in the preparation of the polymers of this invention. These are particularly receptive to dyes at neutral conditions, i. e., at pH of about 7. The polymers have superior thermal stability after exposure to alkaline conditions as compared to polymers from quaternaries which do not have carboxyl or carbalkoxyl groups. This property is of particular advantage in connection with copolymers of the quaternary ammonium compounds of this invention with other vinylidene monomers whose polymers generally are deficient in dye receptivity. This is described in greater detail in copending applications Serial Nos. 216,838 and 216,839, filed March 21, 1951, by Arthur L. Barney, the latter now Patent No. 2,677,679.

Particularly valuable because of their properties are the copolymers with acrylonitrile wherein the latter is present in predominant amount. Thus copolymers containing 1–20% of the quaternary ammonium units of the present invention and at least 80% of acrylonitrile units are markedly improved in dyeability over the acrylonitrile homopolymer but without undue sacrifice of the outstanding properties of acrylonitrile polymers. Copolymers containing 2–10% of the quaternary ammonium monomer units of this invention with at least 80% and preferably at least 85% of acrylonitrile units are, because of the superior combination of dyeability, strength resistance to solvents, and stability to conventional textile treating agents, particularly preferred.

The term "multiple" is used in the claims in the sense of Webster's New International Dictionary of the English Language (Merriam, Springfield, Mass., 1944, page 1609) of "more than one."

The foregoing detailed description has been given for clearness of understanding only and no unnecessary limitations are to be understood therefrom. The invention is not limited to the exact details shown and described for obvious modifications will occur to those skilled in the art.

What is claimed is:

1. Beta-vinyloxyethyl dicarbomethoxyethyl methylammonium chloride

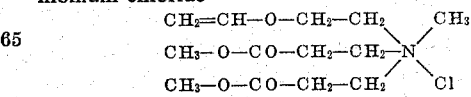

2. A beta-vinyloxyethyl dicarboalkoxyalkyl alkylammonium chloride of the formula

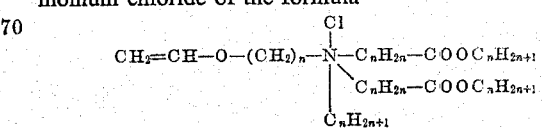

wherein each $n$ is a positive integer from one to four.

3. A beta-vinyloxyalkyl dicarboalkoxyalkyl alkylammonium salt, having but one non-aromatic carbon to carbon unsaturation, of an acid of molecular weight up to 250 of the formula

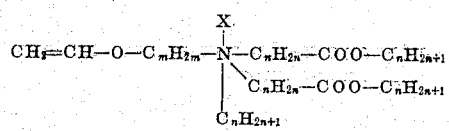

wherein X is the anion of said acid, m is an integer from 2 to 3, and each n is an integer from one to four.

4. A beta-vinyloxyethyl dicarboalkoxyalkyl alkylammonium chloride

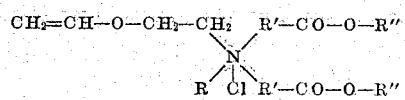

wherein R and R'' are alkyl groups each of up to four carbons and R' is an alkylene group of up to four carbons.

5. A compound, having but one non-aromatic carbon to carbon unsaturation, from the class consisting of salts and esters, with alkanols of up to four carbons, of an acid of the formula

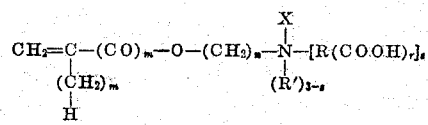

wherein X is the anion of an acid of molecular weight up to 250, r and s are positive integers up to 3 with at least one plural, m is a cardinal number from zero to one, n is a positive integer from 2 to 3, R is a saturated aliphatic hydrocarbon radical of up to eight carbons and of valence r+1 and R' is an alkyl radical of up to four carbons.

6. A polymer of the compound of claim 5.

7. A copolymer of a major amount of acrylonitrile and a minor amount of the compound of claim 5.

8. An ester having but one non-aromatic carbon to carbon unsaturation, with an alkanol of up to four carbons of an acid of the formula

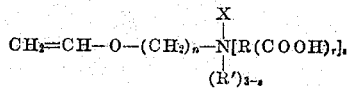

wherein X is the anion of an acid of molecular weight up to 250, r and s are positive integers up to 3 with at least one plural, n is a positive integer from 2 to 3, R is a saturated aliphatic hydrocarbon radical of up to eight carbons and of valence r+1 and R' is an alkyl radical of up to four carbons.

9. A copolymer of a major amount of acrylonitrile and a minor amount of the compound of claim 8.

10. An ester, having but one non-aromatic carbon to carbon unsaturation, with an alkanol of up to four carbon atoms, of an acid of the formula

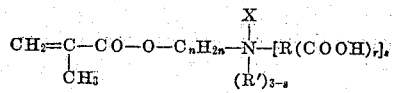

wherein X is the anion of an acid of molecular weight up to 250, r and s are positive integers up to 3 with at least one plural, n is a positive integer from 2 to 3, R is a saturated aliphatic hydrocarbon radical of up to eight carbons and of valence r+1 and R' is an alkyl radical of up to four carbons.

11. A polymer of the compound of claim 10.

12. A copolymer of a major amount of acrylonitrile and a minor amount of the compound of claim 10.

13. An ester, having but one non-aromatic carbon to carbon unsaturation, with an alkanol of up to four carbon atoms, of an acid of the formula

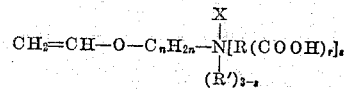

wherein X is the anion of an acid of molecular weight up to 250, r and s are positive integers up to 3 with at least one plural, n is a positive integer from 2 to 3, R is a saturated aliphatic hydrocarbon radical of up to eight carbons and of valence r+1 and R' is an alkyl radical of up to four carbons.

14. An ester, having but one non-aromatic carbon to carbon unsaturation, with an alkanol of up to four carbon atoms, of an acid of the formula

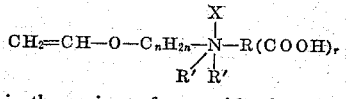

wherein X is the anion of an acid of molecular weight up to 250, r is a positive integer from 2 to 3, n is a positive integer from 2 to 3, R is a saturated aliphatic hydrocarbon radical of up to eight carbons and of valence r+1 and R' is an alkyl radical of up to four carbons.

References Cited in the file of this patent

UNITED STATES PATENTS

| | | |
|---|---|---|
| 2,017,537 | Hoffmann et al. | Oct. 15, 1935 |
| 2,138,763 | Graves | Nov. 29, 1938 |
| 2,458,422 | Reynolds et al. | Jan. 4, 1949 |
| 2,484,420 | Minsk et al. | Oct. 11, 1949 |
| 2,601,251 | Bruson | June 24, 1952 |